May 4, 1954
C. T. DENKER ET AL
2,677,502
TRACTION TREAD
Filed Nov. 28, 1951
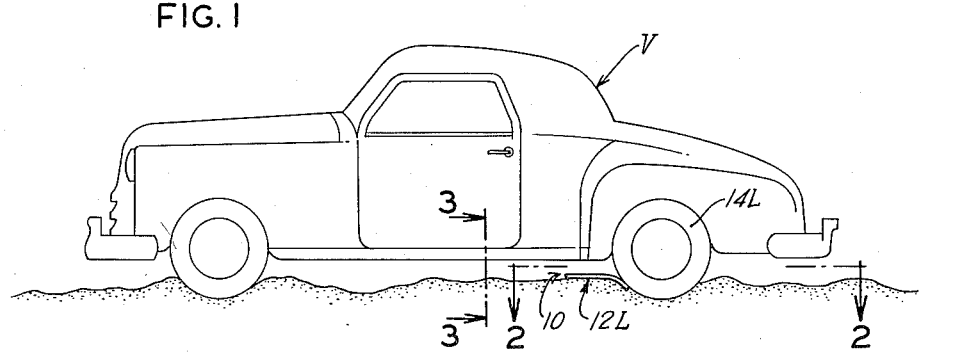
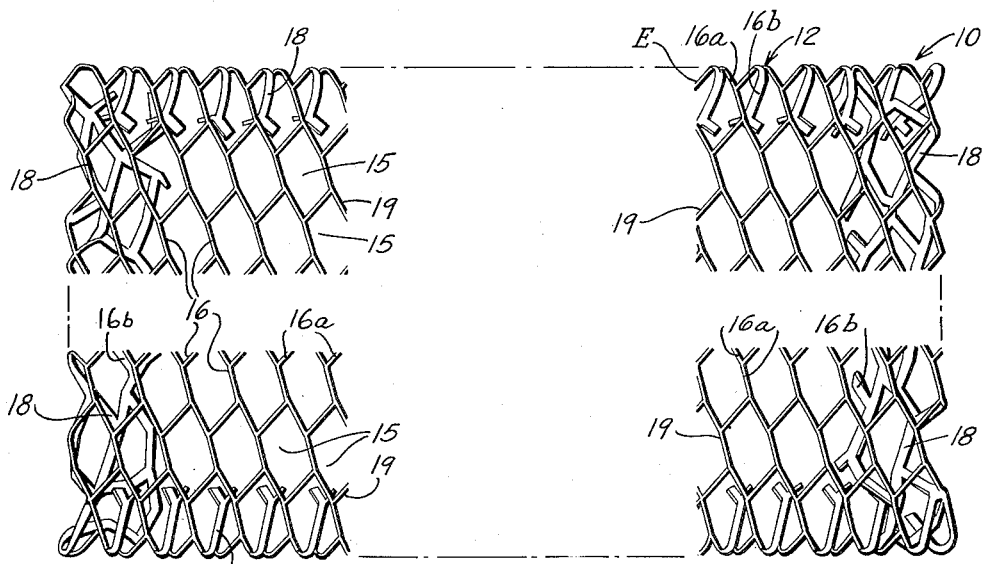
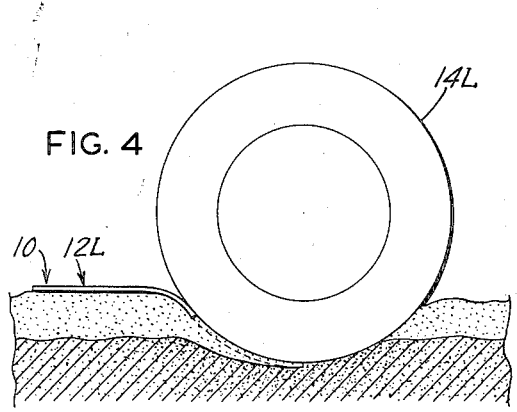
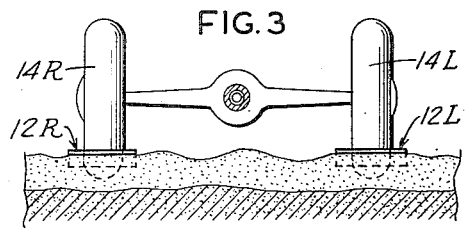
*INVENTOR.*
CHARLES T. DENKER
JOHN KMIT
BY *Wallace and Cannon*
ATTORNEYS Patented May 4, 1954

2,677,502

UNITED STATES PATENT OFFICE 2,677,502

TRACTION TREAD

Charles T. Denker and John Kmit, Chicago, Ill.

Application November 28, 1951, Serial No. 258,618

1 Claim. (Cl. 238—14)

This invention relates to traction devices and, more particularly, to traction devices which are especially well adapted to assist in extricating automotive vehicles from snow banks, mud holes, and the like.

As is well known, during periods of inclement weather, and especially during seasons when ice and snow are on the ground to make driving hazardous many people carry sacks, or other containers, containing salt, sand, and the like, together with shovels and other implements in their automotive vehicles, such as automobiles and trucks, to assist them in freeing their vehicles if they become stuck in the snow or mud. Such equipment is bulky and burdensome to carry, and uses what is often space that could be better used for hauling other things such as luggage and the like. Also, containers of salt, sand, and the like constitute a menace to the cleanliness of the interior of the vehicle because of the danger of spilling.

It is a primary object of our invention to overcome such disadvantages and to afford novel, compact traction devices which are efficient and effective in assisting the freeing of automobiles and the like that are stuck in snow, ice, mud, and the like, and which may be readily carried in a relatively small space in the automobile.

Another object of our invention is to afford novel traction devices which effectively bite into the mud or snow in which an automobile may be stuck and afford effective treads or trackways over which an automobile may be driven to free it from such snow or mud.

Yet another object of our invention is to provide such novel traction treads constructed from expanded metal, and which may be carried either in flat form or rolled form in an automotive vehicle without deleteriously effecting their efficiency as traction devices.

Other and further objects of the present invention will be apparent from the following description and claim and are illustrated in the accompanying drawings which, by way of illustration, show a preferred embodiment of the present invention and the principles thereof and what we now consider to be the best mode in which we have contemplated applying the principles. Other embodiments of the invention embodying the same or equivalent principles may be used and structural changes may be made as desired by those skilled in the art without departing from the present invention and the purview of the appended claim.

In the drawings:

Fig. 1 is a side elevational view of the preferred form of our invention shown in position of use with an automobile;

Fig. 2 is a broken top plan view of a tread member illustrating my invention looking in the direction of the arrows 2—2 in Fig. 1;

Fig. 3 is a detail view looking in the direction of the line 3—3 in Fig. 1, and

Fig. 4 is an enlarged detail view similar to Fig. 1.

In the drawings a traction device 10 comprising a pair of traction tread members 12L and 12R is shown used with an automobile V to illustrate the preferred embodiment of our invention.

The traction tread members 12L and 12R are preferably identical and are interchangeable, the difference in reference numerals merely being to distinguish the members used under the left and right sides of the automobile V, respectively, the member 12L being shown in Figs. 1, 2, 3 and 4, in operative position under the left rear wheel 14L of the automobile V, and the member 12R being shown in Fig. 3 in position for use under the right rear wheel 14R of the automobile V.

Our novel traction device 10 is provided for the purpose of affording relatively small, compact, effective media for efficiently improving the traction of stuck or mired vehicles so as to enable the vehicles to be extricated by increased traction under their own power from mud holes, snow banks, and the like, and which eliminates the necessity for carrying the undesirable, relatively bulky equipment such as salt and sand heretofore commonly carried.

The traction device 10 embodies the two aforementioned traction tread members 12L and 12R each of which may be placed under a power wheel or drive wheel of an automobile or the like, and, when so placed, affords a novel, effective surface of increased traction to assist in driving the automobile under its own power from the place in which it is stuck or mired.

Each of the members 12L and 12R preferably comprises an elongated substantially rectangular sheet of material commonly known in the trade as "expanded metal," as shown in detail in the illustration of the member 12L in Fig. 2. Each member 12L and 12R has a plurality of relatively closely spaced openings or interstices 15 therethrough, which are separated from each other by strips or bands of metal 16.

Each of the edges E of each of the members 12L and 12R comprises one edge 18 of the sheet of material folded back upon the central body portion 19 thereof to afford a double thickness of metal at the edge portions of the body portion 19.

The bands of metal 16, separating the openings 15 have relatively thin sharp lateral edges 16a but the side faces 16b thereof are of substantial width as is best seen in Fig. 2.

The bands 16 in the central body portion 19 are primarily disposed in such position that the respective opposite lateral edges 16a thereof lie substantially in the plane of a respective face of the body portion 19, with the faces 16b of the bands 16 extending between and transversely to the planes of the opposite faces of the body portion 19.

Unlike the bands 16 in the body portion 19 of the members 12L and 12R, the bands 16 in the edge portions 18, after being bent back on the body portion 19 of the member 12L and 12R in accordance with our invention, are so disposed that flat faces or side faces 16b thereof are disposed substantially parallel to the faces of the body member 19 with the lateral edges 16a of these latter bands 16 disposed in a substantially unitary plane parallel to the planes of the faces of body portion 19.

In this manner it will be seen that the body portion 19 of our novel members 12L and 12R presents a plurality of hexagonal-shaped openings 15 of substantially uniform size and shape which are defined at the faces of the members 12L and 12R by a plurality of outwardly facing relatively sharp edges 16a, whereas the marginal edge portions E present a plurality of openings 15 of non-uniform size and shape which are defined by a plurality of a combination of outwardly facing relatively wide surfaces 16b having relatively sharp edges 16a, disposed in the folded back edge portions 18, and laterally facing wide surfaces 16b having outwardly facing sharp edges 16a disposed in the overlying portions of the central body portion 19. This is a desired feature of traction devices embodying our invention as will be discussed in greater detail presently.

In the use of our novel invention, when an automobile, or the like, becomes stuck or mired in the snow, mud, and the like, the members 12L and 12R may be placed under respective opposite power wheels or drive wheels of the vehicle which are commonly the rear wheels of the vehicle.

The members 12L and 12R are, in use, placed either in front of or in back of the respective drive wheels, depending on whether the vehicle is to be extricated in a forward or rearward direction. Normally, each member 12L or 12R is in alignment with a respective one of the power wheels and in parallel relation to the length of the vehicle, with one end edge portion of the member 12L or 12R pushed firmly under the periphery of the wheel as shown in solid lines in Figs. 1 and 3.

The members 12L and 12R may, of course, be of various widths and lengths in accordance with our invention but we prefer that they be of a width not substantially less than the width of the tread surface of the wheel with which they are to be used and not susbtantially more than twice the tread surface and preferably that they be substantially one and one-quarter times the width of such tread surface. Also, we prefer that the members 12L and 12R be of a length not substantially less than the diameter of the wheel with which they are to be used and not substantially more than twice such diameter, and preferably be substantially one and one-quarter times said diameter. It will be seen that the members 12L and 12R are of such width that when placed in operative position under an automobile, they do not engage each other.

As will be appreciated, oftentimes, when a vehicle becomes stuck in snow or mud, the initial attempts to free the vehicle result in the wheels spinning and putting a high polish or glaze on the central, and especially the central bottom portion of the hole or rut in which the wheel is buried. This is especially true in snow, where the heat generated by the initial spinning of the wheels causes the adjacent ice and snow to melt, so that the moisture thus formed may freeze again and this, together with the packing of the snow creates a surface having a very low coefficient of friction so that the traction of the usual automobile tire or wheel thereon is very poor. This is especially true of the central portion of the rut or hole in which the wheel is stuck, whereas in many instances the sides or edges of such rut remain relatively soft.

Our novel invention is especially well adapted for effectively assisting in the extricating of automobiles under such difficulties. Thus it will be seen that, with our novel members 12L and 12R having a central body portion C having the outwardly facing sharp edges 16a, and embodying the edge portions E having both the transversely disposed and outwardly disposed sharp edges 16a and wide faces 16b, when the members 12L and 12R are placed in proper position in alignment wtih the power wheels of the stuck automobile, the sharp edges 16a of the central body portion C are so positioned that the weight of the car tends to press them into glazed, slippery central portion of the rut or hole, the sharp edges tending to dig or bite into such surface readily. The surface of snow or mud that the edges E engage, however, are normally much softer and thus it will be seen that, with our novel construction the marginal edges E present both transversely disposed sharp edges 16a and outwardly disposed sharp edges 16a so that the marginal edges E are effective to bite into and catch in this softer surface in two directions and afford a particularly effective surface for this purpose.

With the members 12L and 12R disposed under the opposite power wheels of an automobile as shown in solid lines in Figs. 1 and 3, power may then be applied to the wheels. This initial application of power tends to pull the members 12L and 12R down into the rut or hole into the position shown in broken lines in Fig. 3, at which position the weight of the vehicle on the central body portion is sufficient to cause the sharp edge 16a thereof to dig or bite into the underlying snow or mud surface and stop the movement of the members 12L and 12R. At the same time, the outward pressure of the wheels 14L and 14R of the vehicle V on the traction members 12L and 12R tend to cause the transversely disposed edges 16a in the edge portion E thereof to dig into the relatively softer side edge portions of the rut or hole, and the edges 16a of those bands 16 which are bent back to form the edge E are so disposed that the initial movement of the members 12L and 12R longitudinally tend to cause them to slice into and catch in the relatively softer side edge portions of the rut. Thus it will be seen that the edge oprtions E afford an especially effective holding portion which materially assists the central body portion C in holding the members in position.

The members 12L and 12R when disposed in the position shown in broken lines in Fig. 3 afford a highly effective traction surface having a relatively high coefficient of friction and which is normally effective to permit the vehicle V to be extricated from its mired condition under its own power.

The size of the openings 15 is to be controlled within certain limits. If the openings 15 are too large, of course, a reduced number of edges 16a are afforded, and, on the other hand, we have found that if the openings are too small there is a tendency for them to ice or glaze over under winter conditions. The openings we prefer to use are preferably not substantially less than three-sixteenths of an inch in width, and not substantially more than three-quarters of an inch in width, and are preferably substantially five-sixteenths of an inch in width. As is best seen in Fig. 2, the openings 15 in the preferred form of our invention, are of elongated hexagonal shape wherein openings having a width of five-sixteenths of an inch preferably have a length of substantially one-half inch, and the openings 15 having other widths preferably have lengths which vary substantially proportionally.

It will be seen that the members 12L and 12R of our novel traction device 10 are normally flat and relatively small, and may be carried in a vehicle either flat or in rolled form, and afford an effective, practical device for assisting in the extricating of vehicles from mud holes, snow banks and the like.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claim.

We claim:

A portable traction device for use in freeing automotive vehicles stuck in snow, mud, and the like, and comprising a flexible elongated sheet metal traction member having a plurality of openings extending therethrough, said traction member being not substantially wider than twice the width of the wheels of said vehicle nor substantially longer than twice the diameter of said wheels, said openings being defined by metal strips having narrow lateral edges and relatively flat faces wider than said lateral edges, said faces of said strips in the central portion of said member being disposed transversely to the planes of the faces of said member, said member being adapted to be placed under a power wheel of such an automobile to afford traction surfaces to assist in freeing such a stuck automobile, and the strips at the sides and ends of said member being bent back on and then under the central portion of said member with the flat faces of the strips parallel to said faces to afford grippers of double thickness at such sides and ends of the traction member.

References Cited in the file of this patent

UNITED STATES PATENTS

| Number | Name | Date |
| --- | --- | --- |
| 2,141,400 | Mack | Dec. 27, 1938 |
| 2,443,319 | Mack | June 15, 1948 |

FOREIGN PATENTS

| Number | Country | Date |
| --- | --- | --- |
| 571,434 | Great Britain | Aug. 24, 1945 |